United States Patent [19]
Carmien

[11] 3,753,602
[45] Aug. 21, 1973

[54] ADAPTER FOR FIBERGLASS TOOL HANDLES AND OTHER FIBERGLASS CONNECTIONS

[75] Inventor: Joseph Allen Carmien, Sun Valley, Calif.

[73] Assignee: Nupla Corporation, Sun Valley, Calif.

[22] Filed: Jan. 28, 1972

[21] Appl. No.: 221,615

[52] U.S. Cl.............. 306/33, 287/20.3, 145/29 R
[51] Int. Cl............................................. B25g 3/28
[58] Field of Search............................ 306/32, 33; 145/29 R, 29 B; 287/20.3; 24/126 R

[56] References Cited
UNITED STATES PATENTS

| 255,166 | 3/1882 | Hardie | 306/32 |
| 1,096,650 | 5/1914 | Urschel | 306/32 |
| 3,306,970 | 2/1967 | Kowalski | 24/126 R |
| 2,859,056 | 11/1958 | Marks | 287/20.3 |
| 1,914,802 | 6/1933 | Cochrane | 306/33 X |

Primary Examiner—Andrew V. Kundrat
Attorney—Robert C. Comstock

[57] ABSTRACT

An adapter for connecting tool heads to fiberglass tool handles and for making other fiberglass attachments. An adapter which is preferably formed in two sections is mounted around and over the end of the tool handle. Interlocking means or frictional engagement are provided to hold the adapter in place. The tool head is provided with an interior opening which is formed complementarily to the tapered exterior of the adapter. The head is driven into place around the adapter by striking the end of the handle on the ground. The adapter is capable of cold flow to fill in a substantially perfect manner the area between the tool handle and head.

1 Claim, 8 Drawing Figures

Patented Aug. 21, 1973  3,753,602
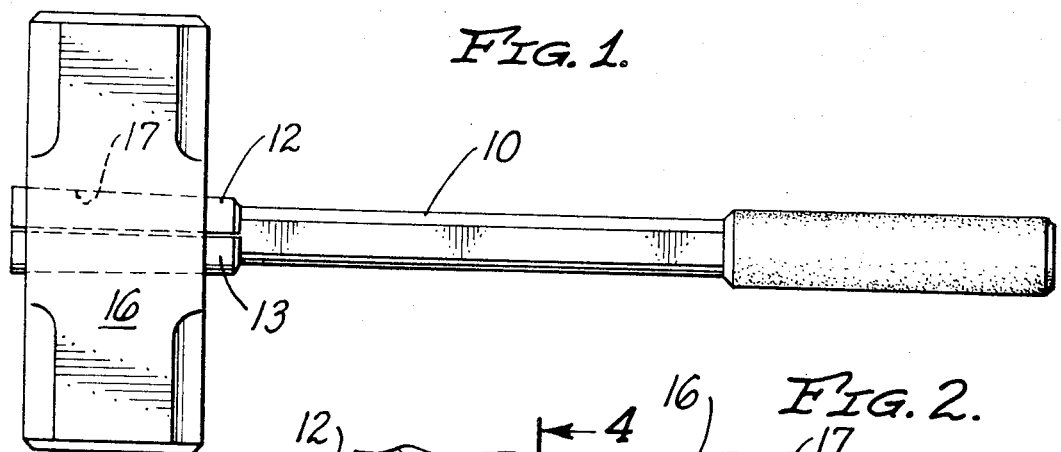
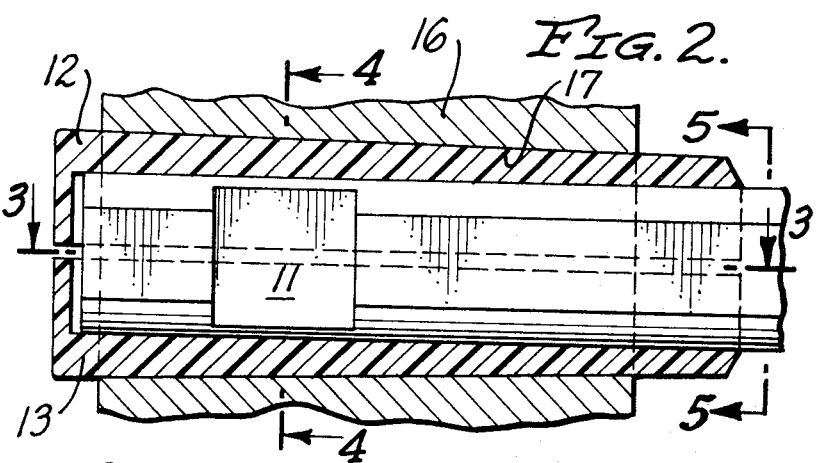
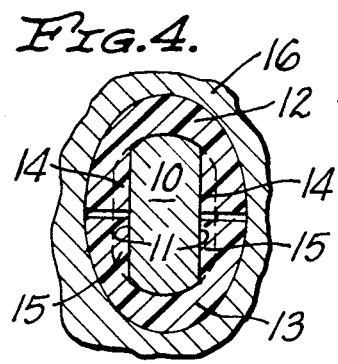
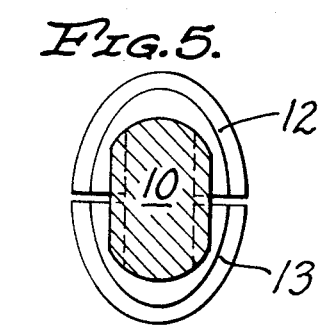
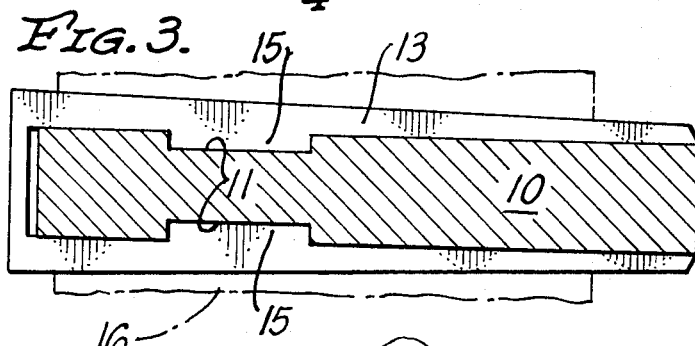
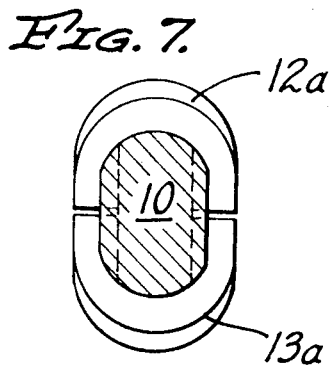
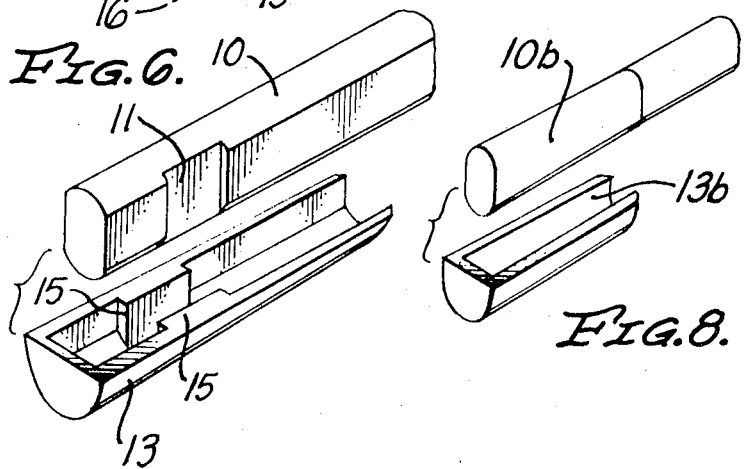
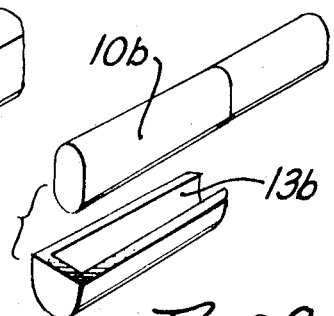

ADAPTER FOR FIBERGLASS TOOL HANDLES AND OTHER FIBERGLASS CONNECTIONS

BACKGROUND OF THE INVENTION

1 Field of the Invention

The invention relates to an adapter for fiberglass tool handles such as hammers, sledges, axes, etc. which may also be used for other attachments or connections to fiberglass such as guy rods, catenaries, concrete reinforcing bars and any other uses where a connection is made to a fiberglass rod or bar.

2. Description of the Prior Art

Until recent years, the only material used for handles in striking, cutting and/or prying tools such as hammers, sledges, peaveys, axes, etc. has been wood. For this reason, the method of attaching the handle to the head, whatever type it might have been, was dictated by the property characteristics of the material, namely wood.

Other than being strong enough to withstand handle abuse the tool would regularly take, there are two conditions which must be accommodated when inserting a wood handle into a tool head: (1) To keep the tool head attached to the handle under all working conditions; (2) To maintain the head tight to the handle since the head could be firmly attached to the handle so that it would not come off, but still might be loose.

On many tools other than picks and mattocks, the eyehole has a double taper or venturi shape, elliptical and concial, with the smallest cross section disposed at approximately the midpoint of the head. The conical section from the top, or that portion of the head farthest away from the grip, is for the purpose of allowing the wood to be expanded by means of a wedge, or wedges, so that the wood is larger than the waist of the eyehole and the head cannot come off the wood handle when used.

The taper starting at the bottom, or the side into which the handle is normally inserted, is for the purpose of accommodating variations in the original wood handle size and the eyehole of the head and, more importantly, allowing the user to re-tighten the head when it becomes loose by driving the handle further into the head and then driving the original wedge further in or adding another wedge.

This construction is not the best because it is essential to have as much bearing between the handle and the head as possible (within the confines of the eyehole). The very best would be if the eyehole in the head were completely straight through and the handle fit it perfectly, which would provide 100 percent bearing. The fact that the eyehole tapers away from the center or waist of the eyehole both ways constantly reduced this bearing as the handle gets loose.

It is not commonly understood why a wooden handle becomes loose in an eyehole. This is usually attributed to the fact that the wood handle has dried out and shrunk and, is thus smaller than the eyehole in the steel head. This is not correct. What in truth happens is that ordinarily a wood handle is dried by soaking it in hot sand for a number of hours and reducing the moisture content at the end that is going to be inserted in the hammer or tool until it is between 5 percent and 7 percent moisture content. It is then assembled while the moisture content is down. The moisture content could not be further reduced in any normal condition of use.

Later, when the tool is exposed to moisture, the wood handle absorbes the moisture and by absorbing it attempts to swell. Inasmuch as the steel head is inflexible, the wood by its moisture absorption must expand. The least strong of the basic materials in wood, lignin, is crushed to pulp by this expansion. When the handle is dried out again, the wood, having no elastic memory and the lignin having been irrevocably crushed, is now smaller than the steel eyehole and is hence loose.

In recent years, some wood handle assemblies have been improved by substituting an epoxy adhesive for the wedge and thus partially sealing the wood against further moisture absorption. This reduces the amount of expansion and consequently reduced a crushing of the wood cells. This is an improvement, but not a complete cure.

An ideal tool handle is one which is formed of fiberglass rather than wood. Fiberglass is far stronger and far outlasts wood. Tool heads cannot be attached to fiberglass handles in the same manner in which they are attached to wood handles because, for example, a wedge cannot be driven into the end of a fiberglass handle in order to spread it in the manner conventionally used with a wood handle. A fiberglass handle usually has a smaller diameter than a wood handle because its added strength makes a larger diameter unnecessary and a needless expense.

The preferred handle material is a fiberglass composite consisting of fiberglass reinforced with plastics such as epoxies, polyesters and the like, although steel, aluminum, and other reinforcing materials than glass, and plastics other than epoxies are suitable. Such handle materials do not have the same shortcomings in regard to moisture absorption, swelling and compressing that wood has, so that a different approach for attachment can be followed.

In this connection, it must be realized that most striking, prying and/or cutting tools are not precision made and, therefore, the eyehole has a rather liberal tolerance as to its size and shape.

Inasmuch as this invention contemplates a handle assembled to a head as a new product, and also a handle used as a replacement, the attachment method must accommodate these varying conditions.

SUMMARY OF THE INVENTION

In essence, my invention contemplates an attachment in which the tool head is provided with an opening having a single straight through taper, as opposed to the double taper hourglass or venturi of the prior art. Such a straight single taper provides the full surface of the opening as a bearing between the head and the handle assembly.

An adapter which is preferably divided into a plurality of sections is provided with an exterior taper which is complementary to the interior taper of the tool head.

The interior of the adapter and the exterior of the handle are provided with mating means such as complementary notches and projections or tapering which prevents longitudinally axial movement of the adapter wih respect to the tool handle.

The head of the tool then is first mounted on the handle. The grip area of a handle must be of a size to fit the users hand which, except for those tools with mattocks eyes, is always larger than the eyehole hence the grip cannot be passed through the eye. Because of this the tool head must be assembled to the handle from the end opposite the grip end.

The adapter sections are then positioned surrounding the handle and in engagement therewith. The head of the tool is then slid along the handle into a position where its opening surrounds the adapter. The head is then firmly driven onto the adapter by striking the end of the handle on a solid surface or by any other suitable means or method. This action is continued until the handle and adapter are firmly wedged within the opening in the tool head.

It is accordingly among the objects of the invention to provide an adapter for fiberglass tool handles and other fiberglass connections having all of the advantages and benefits of the structure set forth above and described in further detail hereinafter in this specification.

It is also among the objects of the invention to provide an attaching means for elongated fiberglass members in which an adapter forms a connecting and holding means between the fiberglass member and the head or other object being attached.

Another object of the invention accordingly is to provide an attachment which is self-locking and self-holding in use and in which all driven wedges and re-wedging are eliminated.

The invention also comprises such other objects, advantages and capabilities as will later more fully appear and which are inherently possessed by the invention.

While there are shown in the drawings preferred embodiments of the invention, it should be understood that the same are susceptible of modification and change without departing from the spirit of the invention.

DESCRIPTION OF THE DRAWINGS

FIG. 1 is a side elevational view of a tool head mounted on a shaft in accordance with my invention;

FIG. 2 is a partial longitudinal sectional view of the same, with the handle shown in elevation;

FIG. 3 is a partial longitudinal sectional view transverse to that of FIG. 2, taken on the line 3—3 of FIG. 2, with the tool head shown in phantom lines;

FIG. 4 is a transverse sectional view taken on line 4—4 of FIG. 2;

FIG. 5 is a transverse sectional view of the handle and adapter only, taken on line 5—5 of FIG. 2;

FIG. 6 is an exploded isometric view showing the exterior of the elongated member and the interior of one of the adapter sections.

FIG. 7 is a view similar to FIG. 5, showing an alternative embodiment of the invention in which two sides of the exterior of the adapter are straight and the other two sides are tapered;

FIG. 8 is an exploded isometric view showing another alternative embodiment of the invention in which the exterior of the elongated member and the interior of the adapter are complementarily tapered instead of being provided with interlocking means.

DESCRIPTION OF THE PREFERRED EMBODIMENT

A preferred embodiment which has been selected to illustrate the invention comprises a fiberglass elongated member 10. The elongated member 10 may comprise the handle of a tool or a rod or other member to which a connection or attachment is to be made. The elongated member 10 may have a cross-section of substantially any configuration, such as round, oval, elliptical, etc. The end of the elongated member 10 to which the attachment is to be made may be provided with a pair of oppositely disposed indentations 11. These need not take any specific form of configuration.

A pair of identically formed adapter sections 12 and 13 respectively are provided with interior surfaces which conform generally to and are complementary with the exterior of the elongated member 10. Each of the adapter sections 12 and 13 is provided on its interior with a pair of oppositely disposed projections 14 and 15 respectively which conform generally to and are complementary with the configuration of the indentations 11 in the end of the elongated member 10.

If the elongated member 10 comprises the handle of a tool, it is preferable for the ends of the adapter sections to extend longitudinally along the sides of the handle. In this way, any striking or prying force resulting from the use of the tool will not be directed in such a manner that it will tend to separate the adapter sections. In such case, which is illustrated in the drawings herein, each of the projections 14 and 15 extends approximately half way across each of the indentations 11.

The tool or the like to which attachment is to be made comprises a head 16 having extending therethrough a continuously outwardly tapering opening 17 formed substantially complementarily to the exterior of the combined adapter sections 12 and 13.

The adapter sections 12 and 13 are preferably formed of material which is capable of controlled cold flow under pressure, so that they will make a secure engagement with the tool handle 10 and tool head 16 and will compensate for surface irregularities in both of them. The adapter material should also preferably have a high coefficient of friction, so that it forms a high degree of frictional engagement with both the tool handle and head. At the present time, glass filled nylon has been found to be the most satisfactory material for use in forming the adapter. It has the properties set forth above, plus the strength and other properties required for the adapter.

In order to mount the head 16, it is first slid over the end of the elongated member 10 which carries the indentations 11. The two adapter sections 12 and 13 are then mounted on the end of the elongated member 10 in such a position that their projections 14 and 15 fit into and engage the indentations 11. The head 16 is then moved back along the elongated member until the interior of its tapered opening 17 makes substantial frictional engagement with the exterior of the adapter sections 12 and 13.

Further movement of the head 16 to overcome such frictional resistance may be achieved either by suitable mechanical means or by moving the elongated member vertically and striking the outer end which carries the adapter sections 12 and 13 upon the ground or any firm surface so that the weight of the head 16 acts to drive it downwardly into tighter frictional engagement around the adapter sections 12 and 13. This action is continued until the head 16 makes secure engagement with the exterior of the adapter sections 12 and 13. At this time, the opposite ends of the adapter sections 12 and 13 should be approximately flush with or extend slightly beyond the opposite edges of the head 16.

The adapter sections 12 and 13 should have portions extending over the end of the elongated member 10 to encapsulate it in order to prevent the fiberglass from being damaged when the end of the elongated member 10 is struck on the floor in driving the head onto the handle.

It will be noted that in the use of the tool centrifugal force will tend to drive the head 16 outwardly along the handle 10 into even tighter engagement with the adapter sections 12 and 13. Use of the tool accordingly tends to tighten rather than loosen the connection between the head and the handle. The connection is accordingly self-holding and self-locking.

It will be obvious that the elongated member 10 might be provided with projections instead of the indentations 11, with the adapter sections 12 and 13 carrying suitable complementary indentations in place of their projections 14 and 15. The type, shape and positioning of the mating projections and indentations may vary as desired and any other suitable means may be utilized for providing an engagement between the adapter and the elongated member which will prevent any substantial movement between them along their longitudinal axis. Thus, FIG. 8 of the drawings shows an alternative embodiment of the invention in which the exterior of the elongated member 10b and the interior of the adapter section 13b are tapered complementarily to each other in order to prevent or limit undesirable longitudinally axial movement.

Likewise, the adapter may be formed of one piece and slitted, slotted or temporarily expanded in such a manner that it can be properly mounted on the elongated member. The adapter may also be formed in three or more sections.

As suggested by FIG. 7 of the drawings, the opening 17 in the head 16 and the exterior of the adapter sections 12 and 13 need not necessarily be tapered in all dimensions. If the invention is to be used with a head having a pre-existing double taper, it may be more convenient to reshape the existing opening in the head to form an opening which is tapered only on two sides, the other two sides being straight. The adapter sections 12a and 13a are then formed complementarily to such an opening, as shown in FIG. 7 of the drawings. The opening 17 may comprise the frustrum of a cone or the frustrum of an elliptical cone. It may have a taper from 1° to 5° per side, with a taper of approximately 2° per side being preferred.

With this invention, the full surface of the openings 17 acts as a bearing between the head 16 and the handle 10.

As suggested by the drawings, the adapter sections 12 and 13 should preferably have their facing edges disposed a slight distance apart from each other. In this way, there is always room for tighter engagement between them and the opening in the head.

With this invention, it is possible to fit a large number of different heads on a single handle by using various sizes and types of adapters.

I claim:

1. An adapter for connecting a tool head to a fiberglass tool handle and for making other attachments to fiberglass members, said adapter having an internal configuration substantially corresponding to the external configuration of said tool handle, said adapter being mounted on the end of said tool handle so that said end is substantially completely surrounded circumferentially by said adapter, engagement means between said adapter and tool handle for preventing substantial longitudinal movement of said adapter with respect to said handle in either direction, said adapter having a continuously outwardly tapered exterior, said tool head having an opening extending therethrough, said opening having a tapered interior formed complementarily to the exterior of said adapter and adapted to fit around and receive said adapter, said tool head adapted to be brought into tighter engagement with said adapter by the application of force to the end of said tool handle, said adapter being formed of strengthened-synthetic resinous material which is solid but somewhat malleable, so as to be capable of cold flowing in response to pressure exerted thereon by said tool head to compensate for dimensional variations and surface irregularities in said tool head and provide a substantially complete engagement between the exterior surface of said adapter and the interior surface of said opening, said adapter comprising a hollow sleeve divided into at least two longitudinal sections, each of said sections having an integral end flange portion extending radially inwardly, said end flange portions being flat and together combining to substantially completely cover the end of said handle and to provide a flat surface of solid but somewhat resilient material which is capable of sustaining repeated blows to prevent damage to the end of said fiberglass handle when said head is mounted on said handle.

* * * * *